United States Patent Office 3,059,421
Patented Oct. 23, 1962

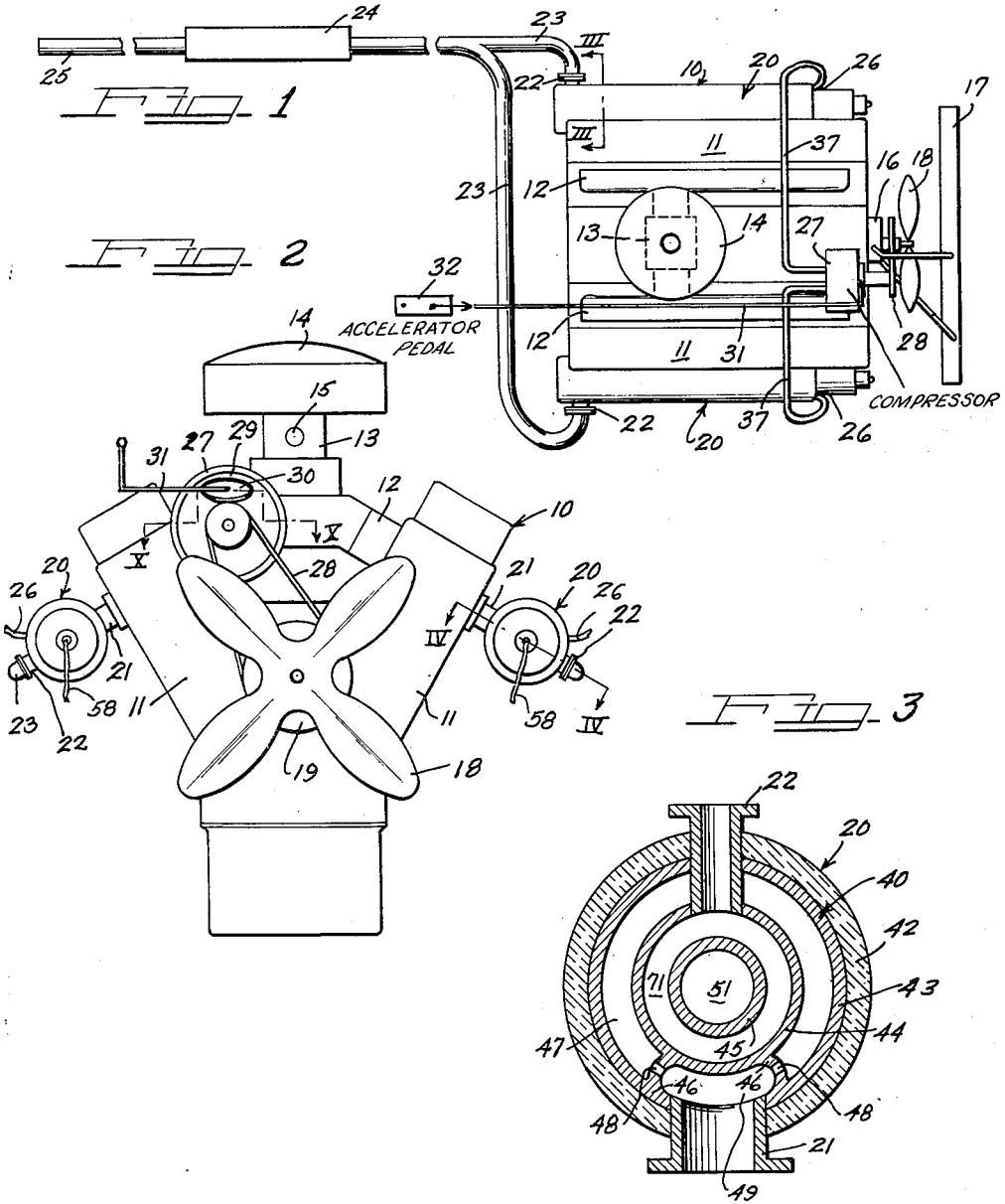

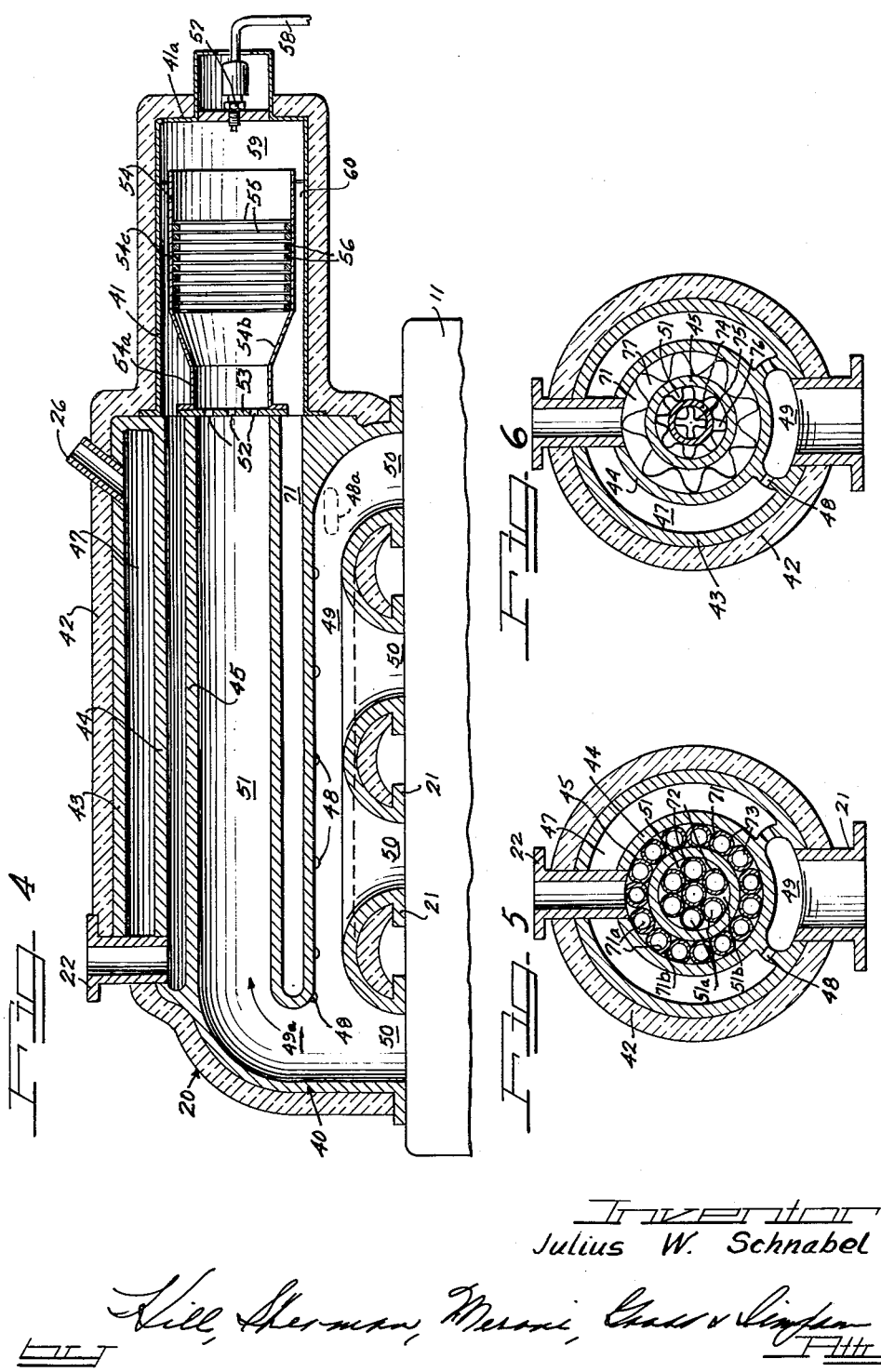

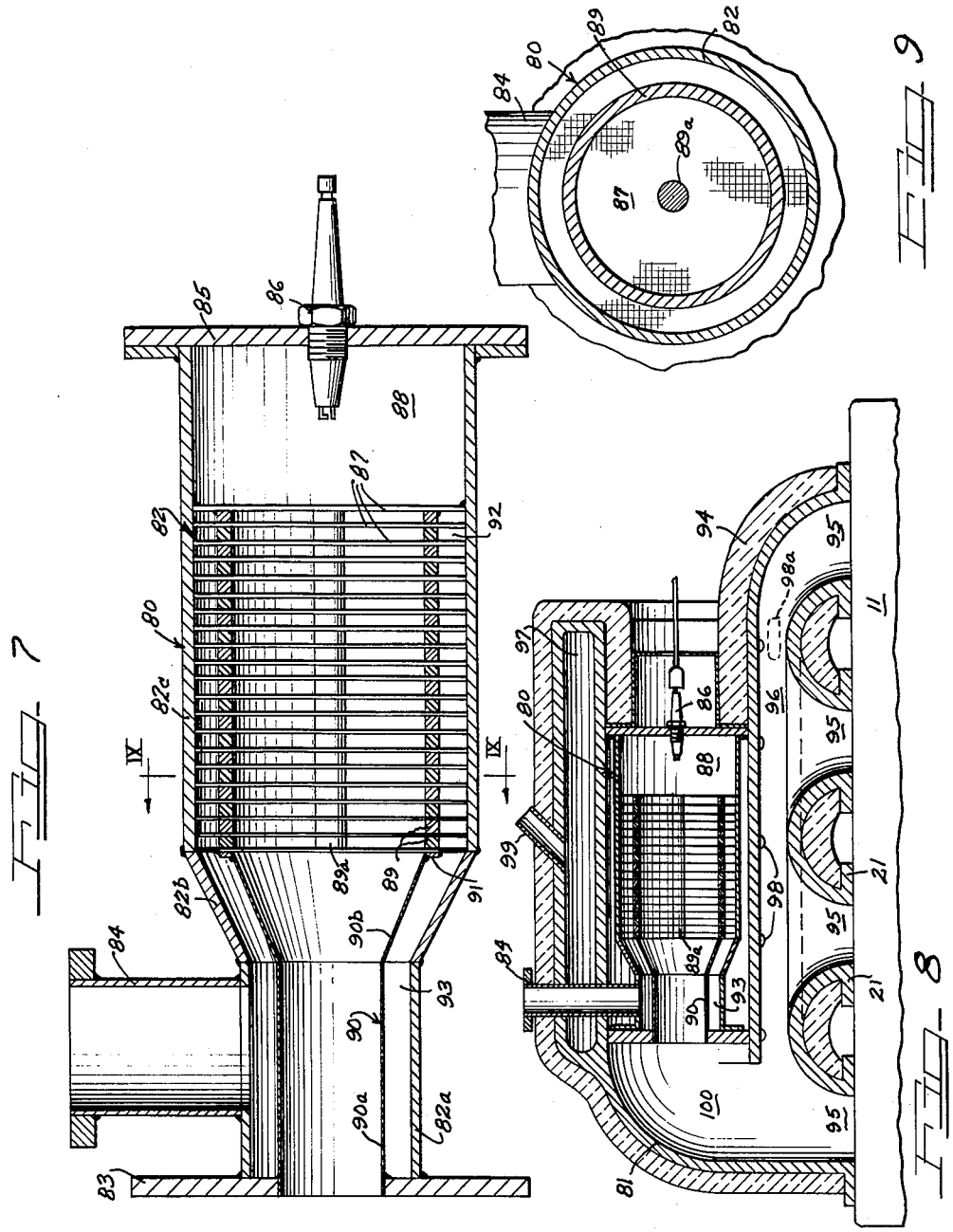

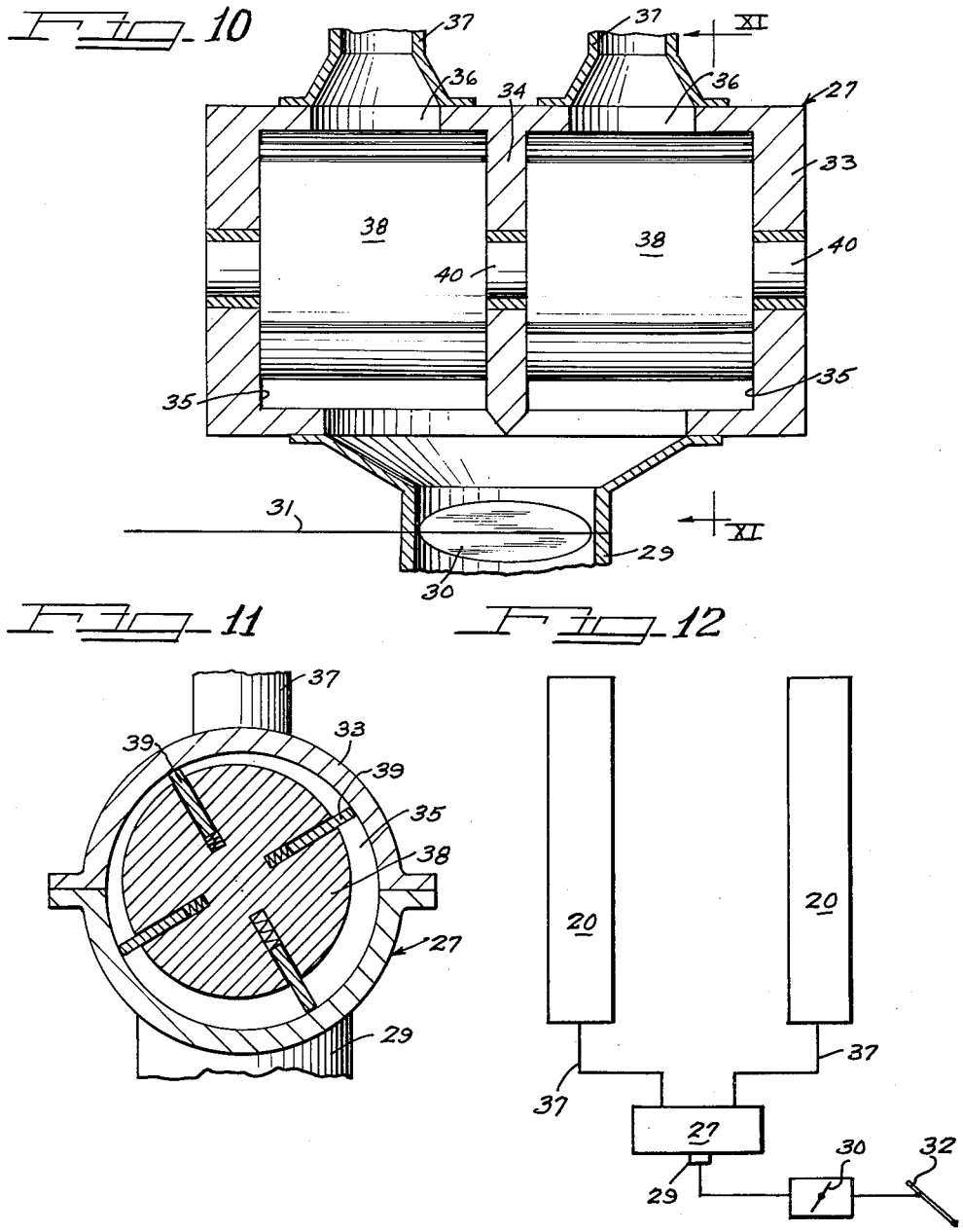

3,059,421
APPARATUS FOR MINIMIZING THE COMBUSTIBLE CONTENT OF EXHAUST GASES
Julius W. Schnabel, Lyndhurst, Ohio, assignor to Thompson Ramo Wooldridge Inc., Cleveland, Ohio, a corporation of Ohio
Filed May 5, 1960, Ser. No. 27,106
10 Claims. (Cl. 60—30)

This invention relates to an inexpensive burner and manifold device for mounting directly on an internal combustion engine to efficiently and safely reduce the unburned gas content of exhaust emissions from the engine without reducing the operating efficiency of the engine. Specifically this invention relates to an afterburner unit including a heat transfer insulated manifold to replace conventional exhaust gas manifolds of automotive engines and a combustor for safely and efficiently burning the combustible contents of engine exhaust gases at very high temperatures maintained by the burning gases themselves.

This invention will be specifically described as embodied in a manifold afterburner for direct mounting on automobile engines in place of the conventional engine manifold, but it should be understood that the combustor of this invention can be used without the manifold of this invention and that both the method and the apparatus of this invention are generally useful for efficiently reducing the combustible content of exhaust gas or other waste gas emissions to a safe level and therefore the scope of this invention includes general usage of the device in environments other than automobile engines.

It is well known that the smog problems which plague certain communities are largely caused by exhaust emissions of automobiles and trucks because the internal combustion engines driving such vehicles, even when efficiently operating, discharge appreciable amounts of carbon monoxide and unburned hydrocarbons. To efficiently remove these noxious ingredients of exhaust gases, it is highly desirable to preserve as much of the heat energy of the gases as possible and to efficiently burn the ingredients at high temperatures without however creating a fire hazard or causing heat damage or discomfort. Further, it is highly desirable that the burning operation be conducted under conditions which do not create a back pressure and do not require appreciable drainage of power from the engine.

A feature of this invention is the provision of a matrix type combustor in the afterburner wherein a series of spaced screens or perforated plates of good heat conductive materials receive the gas flow therethrough in countercurrent relation both en route to the burning chamber and during exiting from the burning chamber to preheat the entering gases and to cool the exiting gases. The screen arrangement maintains a high level burning in the combustor to so effectively reduce the noxious gas content of the exhaust gases that the exiting gases are harmless and cool enough to be discharged into the atmosphere without creating any heat damage or discomfort problems.

Another feature of this invention is to insure delivery of sufficient air to support complete combustion in a plurality of afterburner units which are supplied from a single air source even under conditions when the units are operating under different pressures. According to this invention a single engine driven air compressor has an individual compressor compartment for each afterburner unit which is not affected by back pressure variations in an adjacent compartment. In a preferred embodiment the air compressor has a throttling valve on the inlet that is controlled by an actuator such as the accelerator pedal of the vehicle or intake manifold pressure of the engine.

Another feature of the invention is the provision of air inlets for a manifold type afterburner at locations which will effect a mixture of the air with the exhaust gases before the exhaust gases are allowed to appreciably expand and before they lose their heat content.

Another feature of the invention is the provision of efficient heat transfer means in an exhaust gas burning engine manifold for preheating the air before it is admixed with the exhaust gases and for preheating the air and exhaust gas mixture before it is burned.

It is then an object of this invention to provide an efficient, inexpensive, safe operating device for reducing the combustible content of exhaust or waste gases to such a low level that discharge of the gases into the atmosphere will not produce smog.

Another object of this invention is to provide an afterburner which may replace conventional exhaust gas manifolds of automotive engines or may be attached close to the discharge end of a conventional manifold to so thoroughly burn up the combustible content of the exhaust gases that they can be directly discharged to the atmosphere without poluting the atmosphere.

Another object of the invention is to provide an exhaust gas manifold for an automobile engine which so efficiently burns the exhaust gas combustibles and then cools the burned gases that the gases can be directly discharged into the atmosphere without causing polution or heat damage or discomfort.

A specific object of the invention is to provide a matrix type combustor for an exhaust gas burner wherein burning gases efficiently preheat the incoming gases to maintain a high level burning of the combustibles in the gases.

Another object of this invention is to provide a compact inexpensive afterburner manifold for automobile engines.

A still further object of this invention is to provide an exhaust gas burner with a series of wire mesh screens or perforated metal plate disks for receiving gases to be burned through one portion thereof and receiving the burned and burning gases through another portion thereof.

Another specific object of the invention is to provide a combustor for afterburners with a series of metal screen disks in spaced relation receiving gases to be burned through the central portion thereof and receiving burned and burning gases through the peripheral portions thereof to heat the central portions and maintain a high temperature burning in the combustor.

Other and further objects and features of this invention will be apparent to those skilled in this art from the following detailed descriptions of the annexed sheets of drawings which, by way of preferred embodiments only, illustrate several devices of this invention.

On the drawings:

FIGURE 1 is a top plan view of a V-8 type automobile engine equipped with an afterburner system of this invention;

FIGURE 2 is a front end elevational view of the engine of FIG. 1 with the radiator omitted;

FIGURE 3 is an enlarged transverse cross sectional view of the afterburner exhaust manifold of this invention taken substantially along the line III—III of FIG. 1;

FIGURE 4 is a longitudinal cross sectional view of the afterburner exhaust gas manifold of this invention taken along the line IV—IV of FIG. 2, but shown on a larger scale;

FIGURE 5 is a transverse cross sectional view similar to FIG. 3, but illustrating a modification wherein certain of the chambers are equipped with heat transfer tubes to increase the efficiency of the unit;

FIGURE 6 is a view similar to FIG. 5 but showing another arrangement of heat transfer enhancing means;

FIGURE 7 is a longitudinal cross sectional view of a matrix type combustor for afterburners of this invention;

FIGURE 8 is a longitudinal cross sectional view with parts in elevation of an exhaust gas manifold burner according to this invention using the combustor of FIG. 7 to receive the gases directly into the screen matrices thereof;

FIGURE 9 is a transverse cross sectional view along the line IX—IX of FIG. 7;

FIGURE 10 is an enlarged cross sectional view of the air compressor taken substantially along the line X—X of FIG. 2;

FIGURE 11 is a transverse cross sectional view of the compressor taken substantially along the line XI—XI of FIG. 10;

FIGURE 12 is a diagrammatic plan view of the air flow system for the afterburners of this invention.

As shown on the drawings:

In FIGS. 1 and 2 the reference numeral 10 designates generally a V-block internal combustion engine having engine blocks or cylinder banks 11, 11 each equipped with an intake manifold 12, 12 receiving an air-fuel charge from a carburetor 13 which in turn receives air from the air filter 14 and fuel from a fuel inlet 15. The engine 10 has a conventional engine driven water pump 16 circulating coolant through the jacketed walls of the cylinder blocks 11, 11 and through a radiator 17. A radiator fan 18 mounted on a shaft driven by the engine and projecting from the pump 16 draws air through the radiator 17. A pulley 19 is also provided on this shaft in front of the pump 16.

An afterburner exhaust gas manifold 20, 20 of this invention, is mounted on each engine block 11, 11 and has flanged nipples 21 mounted directly on the engine block 11 to receive the exhaust gases directly from the exhaust valve ports of the engine.

Each manifold 20 has a single outlet 22 at the rear end thereof discharging through tubing 23 into a conventional exhaust gas muffler 24 and thence through the conventional tail pipe 25 to the atmosphere. An air inlet 26 is provided at the front end of each exhaust gas manifold 20 and receives air from an engine driven compressor 27 that is driven through a belt 28 from the pulley 19. The compressor 27 has a single air inlet 29 containing a throttle valve 30 operated by a rod 31 linked to the accelerator pedal 32 of the vehicle as illustrated in FIGS. 1, 2, 10 and 12. The linkage is such that the throttle valve 30 is opened when the pedal 32 is depressed and closed when the pedal 32 is released so that air entering the compressor 27 is progressively throttled as engine fuel supply is decreased.

If desired the positions of the manifolds 20 on the engine blocks 11 may be reversed from the illustrated rear outlet positions and the outlets 22 can be at the front ends of the engine blocks or one manifold 20 can have its outlet 22 at the front and the other manifold 20 can be positioned with its outlet 22 at the rear end of the engine.

As best shown in FIGS. 10 and 11 the compressor 27 has a casing 33 with a dividing wall or partition 34 providing two adjacent compressor compartments 35 each receiving air from the single inlet 29. However, each compartment 35 has its own individual outlet 36 each of which is connected through tubing 37 to the air inlets 26 of the afterburners 20.

Each compressor chamber 35 has a rotor 38 eccentrically mounted therein and carrying a plurality of vanes 39 riding on the bore of the chamber. The two rotors 38 are mounted on the same shaft 40 which is journaled in the casing 27 and also in the partition wall 34.

The compressor 27 is therefore of the vane type with a single air inlet but having a separate compressor chamber, rotor, and outlet for each afterburner.

As illustrated in the diagram of FIG. 12, the compressor 27 divides the air feed to each afterburner 20 and this air flow is not influenced by variations in back pressures in the afterburners. Thus a restriction in one of the tubes 23 from one of the afterburners 20 might cause that afterburner to operate at a higher back pressure than the other afterburner. A conventional compressor with a single outlet joined to both afterburners would deliver more air to the low pressure afterburner thereby robbing the high pressure afterburner of sufficient oxygen to sustain complete combustion. In the present compressor arrangement however, such conditions cannot obtain because the compressor 27 has an individual compressor element for each afterburner and air delivery to each afterburner is therefore only influenced by throttling of the air inlet in response to engine throttle position and by speed of the compressor rotors 38 in response to engine speed. In accordance with this invention throttling of the air inlet 29 can also be automatically accomplished by referencing the throttle valve 30 to intake manifold pressure so that the valve will open on increases in intake manifold pressure and close as the manifold vacuum increases. In this arrangement the air inlet throttling will be responsive to engine load, and actuation will be automatically effected through vacuum lines instead of through accelerator pedal linkage.

As shown in FIGS. 3 and 4, the afterburner 20 includes a manifold casting 40 mounted on the engine block 11 through the flanged inlet nipples 21 and having a combustor casing 41 mounted on the rear end thereof. The casting 40 and casing 41 are surrounded by a cover or jacket 42 of insulating material 42. The purpose of this insulating material is to retain within the afterburner all of the available heat and to prevent overheating of the engine compartment.

The casting 40 includes an outer cylindrical jacket 43 to form the wall of the air inlet chamber, an inner cylindrical wall 44 to form the outer wall of the exhaust chamber for burning gases, another cylindrical wall 45 to form the wall for the gas and air mixture leading to the combustor and apertured partition walls 46 forming the side walls of a manifold passage communicating with the nipples 21.

The multiple substantially concentric cylindrical walls 43, 44 and 45 cooperate to form annular chambers or passages. The chamber 47 between the walls 43 and 44 encircles the manifold casting to provide an air inlet chamber in good heat exchange relation with the wall 44. This air inlet chamber 47 receives air from the air inlet 26 which is fed with compressed air from the compressor 27. The air in chamber 47 discharges through holes 48 in the walls 46 to a manifold chamber or passage 49 having gas inlets 50 provided by the nipples 21. The passage 49 therefore receives the exhaust gases directly from the exhaust gas ports of the engine block 11 and also receives air from the air chamber 47 through the ports or holes 48. These ports or holes 48 are arranged to efficiently admix air with the exhaust gases before these exhaust gases have appreciably expended and before they have lost their heat content.

In place of the plurality of ports 48, a single large port 48a can be used. This port is preferably in the form of an elongated slot positioned adjacent the rear inlet 50 which is upstream from all the other inlets so that the air will be successively admixed with gas emissions from downstream inlets 50.

The exhaust gases passing along the manifold chamber 49 will pick up the air from the ports 48 or the single port 48a in their travel to the forward end of the manifold 40 where they will flow through a passage 49a at the front end of the manifold into a central mixing chamber 51 defined by the inner cylindrical wall 45. The gas and air mixture flows rearwardly through this central passage 51 to pass through the ports 52 of a flame barrier plate 53 at the inlet end of a combustor tube 54 inside of the casing 41. This tube 54 has a reduced diameter cylindrical inlet end 54a receiving the gas and air mixture direct from the flame plate 53 and the tube then flares outwardly at 54b to an enlarged cylindrical portion 54c in spaced concentric relation with the cylindrical side wall of the casing 41. This enlarged portion 54c terminates inwardly from the rear end wall 41a of the casing 41.

A series of spaced parallel wire mesh or perforated metal disks 55 are mounted in the enlarged portion 54c of the combustor tube 54 and extend from the large end of the tapered portion 54b into inwardly spaced relation from the large open end of the tube portion 54c. These wire mesh disks are held in spaced apart relation by rings 56 to provide a removable arrangement but of course the disks could be secured directly to the combustor tube 54 by tack welds, tangs or the like.

While both the flame barrier plate 53 and the series of disks 55 are illustrated, it should be understood that either one alone may be used. Usually the plate 53 is not necessary when the disks are present because the disks form a sufficient barrier to prevent back burning in the mixing tube 57.

The gas and air mixture in the combustor tube 54 is ignited by a spark plug 57 mounted in the end wall 41a and energized from a modified electrical ignition system of the automobile engine through a wire 58. The gases will burn in the tube 54 and the downstream screens 55 will be heated to incandescence. The screens 55 are therefore composed of high heat transfer and high temperature corrosion resisting metals such as nickel or alloys such as Nichrome; Inconel; Monel, and the like. The burning gases will pass rearwardly through the open end of the tube 54 into a chamber 59 in the end of the casing 41. This chamber is a turbulence chamber and the burning gases emerge therefrom through the annular passage 60 surrounding the tube 54 and discharging into the chamber 71 between the walls 44 and 45. This chamber 71 surrounds the chamber 51 and in turn is surrounded by the chamber 47. The burned gases from the chamber 71 discharge through the outlet 22 into the exhaust pipes 23.

Therefore, in operation, the hot exhaust gases from the engine exhaust valve ports discharge directly into the manifold chamber 49 where they pick up sufficient air for supporting combustion of their unburned gas content through the ports 48. The air emerging through the ports 48 has been preheated in the jacket chamber 47 which surrounds the annular discharge passage 71 for the burning gases. The hot air from the ports 48 is effectively admixed with the exhaust gases before these gases are allowed to expand appreciably and before they lose their heat content. The gas and air mixture then passes through the central chamber 51 which is surrounded by the burning gas chamber 71 and in turn is heated by the burning gases. The preheated gas and air mixture composed of the hot exhaust gases and the preheated air is discharged through the flame barrier plate 53 into the combustor tube 54 where it is burned and then passes back through the chamber 71 to the outlet 22. All of the heat is retained immediately adjacent the engine block 11 by the insulation cover 42. The correct amount of air is fed to the exhaust gases because the compressor 27 is driven by the engine and has its inlet throttled in accordance with engine loads. At low speeds and low loads only small amounts of air are necessary to support combustion of the relatively small amounts of unburned gases in the exhaust. However, when the engine load increases, the throttle at the compressor inlet is opened to admit more air to the compressor and even though the engine speed may still remain relatively low, the air supplied to the inlets 26 will be increased. Of course, as the engine speed increases, the compressor will be driven faster to increase the air supply. The combustor tube need not be equipped with the screens 55 in the modification of FIG. 4.

As shown in FIG. 5, the passageway 51 for the gas and air mixture and surrounding passage 71 for the burned and burning gases can be equipped with tubes to increase the heat transfer capacity of these chambers. Thus the chamber 51 is packed with a series of metal tubes 72 composed of high heat transfer corrosion resisting metals, such as nickel or alloys such as stainless steel, Monel, and the like. These tubes 72 divide the passage 51 into a myriad of passages 51a inside of the tubes and another myriad of passages 51b outside of the tubes. The gases from the connecting passage 49a at the front end of the manifold will thus flow through and around the tubes 72 and heat from the wall 45 of the passage will be efficiently transferred to the gases. Likewise, the chamber 71 has a ring of high heat transfer rate metal tubes 73 therein tightly engaging the walls 44 and 45 in good heat transfer contact therewith. Thus the chamber 71 is divided into a myriad of passages 71a inside of the tubes and a second myriad of passages 71b surrounding the tubes and each of these passages are in good heat transfer relation through the tubes with both the walls 44 and 45. As a result heat from the burning gases is efficiently conducted through these walls to heat the passage 51 as well as the air passage 47.

In the arrangement of FIG. 6 the passage 51 inside of the wall 45 receives a smaller diameter tube 74 of good heat transfer material and this tube 74 in turn receives a fluted thin metal foil tube 75. The tube 74 in turn is surrounded by a second fluted tubular foil 76 engaging both the tube 74 and the wall 45. Next the chamber 71 is equipped with a fluted foil tube 77 in good heat transfer contact with both the walls 44 and 45.

The exhaust gases and air from the passage 50 thus flows through a passage inside of and surrounding the tube 74, which passages are in turn divided by fluted foils of good heat transfer material so that the gases are very efficiently heated from the chamber 71. In turn the chamber 71 is equipped with fluted tubular foil 77 so that it will effect good heat transfer to the outer wall 44 and the inner wall 45.

From the above consideration of FIGS. 5 and 6, it will be understood that the passages en route to and exiting from the combustor can be equipped with any suitable heat transfer means to enhance heating of the incoming gases and air from the heat content of the exiting gases. Efficient heat transfer in this manifold area of the afterburner will insure maintenance of high temperature combustion in the combustor tube and discharge of relatively cool burned gases from the afterburner.

A modified combustor is illustrated in FIGS. 7 and 9. This combustor 80 can be used with the manifold casing 40 of FIGS. 3 to 6; can be used with a simplified casing arrangement 81 as shown in FIG. 8; can be used with a conventional engine manifold; or can be mounted in any exhaust gas conveying tube or duct.

The combustor 80 includes an outer metal tube 82 with a reduced diameter end 82a that is equipped with a mounting flange 83 for assembly of the combustor to a suitable manifold or tube. A burned gas outlet tube 84 extends radially from the small diameter tubular portion 82a. The small diameter portion 82a merges into an outwardly flaring frusto-conical tapered portion 82b which terminates at its large end in the main cylindrical large diameter body 82c of the combustor tube 82. An end wall 85 closes the rear end of the combustor tube 82 and carries a spark plug 86.

A series of foraminous plates such as wire mesh screen or perforated metal plate disks 87 is mounted in the large diameter tube portion 82c to extend from the large end of the tapered wall 82b into spaced relation from the end wall 85 so as to provide a turbulence chamber 88 between the last wire mesh disk and the end wall 85 into which projects the electrode end of the spark plug 86. The wire mesh disk 87 preferably increase in coarseness from the tapered portion 82b to the turbulence chamber 88 so that the successive screens are composed of heavier wire. The fine mesh screens composed of the lighter wire will be the screens most remote from the turbulence chamber 88. If perforated metal plates are used the holes in successive plates will increase in size toward the turbulence chamber.

Each screen disk 87 is separated by a solid metal ring 89 brazed or welded to the adjacent disks inwardly from their peripheral edges so that a marginal portion of each disk projects beyond the rings. The rings 89 are preferably of a diameter so that the area of each wire mesh disk 87 inside of the ring is substantially equal to the area of each disk surrounding the ring. The stack of disks with their interposed rings can be tack welded or otherwise secured to the tube portion 82c. The rings 89 can be grooved in their disk receiving faces to receive brazing material or the like for insuring a good seal and a firm bond between the ring and the disk.

To prevent funneling of cool gases through the centers of the disks 87, a metal disk plug 89a can be brazed to the adjacent screens at the centers thereof to block off gas flow and create an annular flow path through the screens between the peripheral rings 89 and the plugs 89a. In place of separate plugs 89a, a central rod could extend through holes in the centers of the screens or perforated plate disks.

A relatively thin tube 90 of good heat transfer metal is mounted inside of the portions 82a and 82b of the combustor tube 82 in spaced concentric relation from these portions. The tube 90 thus has a reduced diameter tubular portion 90a inside of the tube portion 82a and the end of this reduced diameter portion 90a is seated in the end wall or flange 82. The other end of the tube 90b is flared at the same taper angle as the portion 82b of the combustor tube 82 and the outer end of this flared portion is secured to a ring 91 on the end wire mesh disk 87. By this arrangement the incoming gas and air mixture flows through the tube 9 and is directed thereby through the central portions of the wire mesh disks 87 surrounded by the rings 89. The gases with the air admixed therewith to support combustion emerge from the coarsest end mesh disk 87 into the turbulence chamber 88 and are ignited by the spark plug 87. The burning gases then pass from the turbulence chamber 88 through an annular chamber 92 surrounding the rings 89 and into which the marginal portions of the disks 87 extend. This passageway discharges through a second annular passageway 93 between the tube 90 and the combustor tube 80. The passage 93 discharges through the outlet tube 84.

In operation, the burning gases in the turbulence chamber 88 will heat the end wire mesh disks 87 to incandescence and the burning gases passing through the passageway 92 in intimate contact with the peripheral marginal portions of the disks 87 will in turn transfer heat back to the disks. The incandescent screens may be sufficient to maintain combustion and burning may initiate in advance of the turbulence chamber 88. If desired one or more of the end screens could be heated electrically and for this purpose resistance wires could be used in the screens. In such operation the igniter 88 need not be used. Possibly in operation the disks at the turbulence chamber end 88 may add to the heat of the burning gases as they enter the passage 92 and then the very hot gases in this passage will continue to lose heat back to the finer meshed screen disks at the inlet end of the assembly so that by the time the gases reach the passage 93 they will be substantially cooled, transferring their heat to the incoming gases. This wire mesh or matrix type combustor is a very efficient heat transfer media to maintain combustion at a very high temperature level and at the same time to cool down the burned and burning gases so that they can be discharged at a safe and comfortable temperature through the outlet 84.

In one tested unit of this invention twenty-eight successive screen disks 87 were used. The first seven disks at the inlet end were 10 mesh composed of wires of .025 inch in diameter; the next seven were 8 mesh of .064 inch wire; the third seven were 8 mesh of .035 inch wire; and the fourth seven were 6 mesh of .051 inch wire. All screens were nickel.

The combustor unit 80 can be mounted directly on the discharge end of a conventional engine manifold by connecting the flange 83 to the manifold flange which normally receives the exhaust tube or it can be mounted in the exhaust tube ducting spaced from the manifold. In such installations of course the unit will be covered with insulation and air for combustion will be introduced into or in advance of the tube 90.

As shown in FIG. 8, the combustor 80 of FIG. 7 is mounted in an engine manifold casting 81 which is completely surrounded by insulation 94. The casting 81 has the same inlet nipples 21 as described in the embodiment of FIGS. 1 to 6 which are mounted directly on the engine block 11 and provide passages 95 to a manifold passageway 96 receiving preheated air from the air jacket 97 through the ports 98 or through a single slot 98a in the same manner as described in the embodiment of FIGS. 1 to 6. Air is supplied from the engine driven air compressor to the jacket chamber 97 through the inlet 99.

The gas and air mixture from the chamber 96 then passes directly through an end chamber or passage 100 into the tube 90 of the combustor which is conveniently inserted inside of a central recess of the manifold 81. The combustor operates exactly as described in connection with FIGS. 7 and 9 and the burning gases from the turbulence chamber 88 pass into the exhaust chamber 93 and through the outlet 84 to the exhaust tubes. The arrangement of FIG. 8 differs from the arrangement of FIGS. 3 to 6 mainly in the elimination of the mixing passageway 51 between the manifold passage and the combustor.

The afterburners of this invention, by utilizing all of the available heat content of the exhaust gases and by cooling the burned gases before they are discharged from a manifold arrangement that is mounted directly on the vehicle engine in place of the conventional exhaust gas manifold have provided an inexpensive foolproof arrangement at a low initial cost and at a negligible power drain from the engine. The back pressures developed in the afterburners of this invention are very low and the air compressor is driven with practically no drain of engine power. No added fuel consumption is necessary and while the spark plug 86 need only be energized to start combustion continuous activation of the spark plug can be maintained without causing any strain on the electrical system of the vehicle. The afterburners of this invention respond immediately to variations in combustible content of the exhaust gases because the system is sensitive to engine speed and engine load.

The following chart shows the effectiveness of the afterburner of this invention is actual tests on an V-eight cylinder block engine wherein one block of the engine was equipped with the afterburner and the other block was equipped with the conventional exhaust manifold. Comparative readings of the exhaust emissions from both the afterburner and the conventional exhaust gas manifold were made on a non-dispersive infrared analyzer in terms of microamperes. A Liston-Becker model 15 analyzer was used. The table shows the concentration of hydrocarbons in terms of parts per million hexane equivalent and the concentration of carbon monoxide in percent by volume.

| Condition | Basic Engine Emissions | | | | Afterburner Emissions | | | |
|---|---|---|---|---|---|---|---|---|
| | Hydrocarbons | | Carbon Monoxide | | Hydrocarbons | | Carbon Monoxide | |
| | Meter | P.p.m. | Meter | Percent | Meter | P.p.m. | Meter | Percent |
| Idle | 24 | 524 | 7.55 | 9.25 | 1.3 | 25 | 1.7 | .15 |
| 0–50 Accel | 17 | 375 | 33 | 3.1 | 1.3 | 25 | 1.7 | .15 |
| 50 m.p.h. Cruise | 9 | 194 | 17 | 1.4 | 1.1 | 21 | 2.5 | .20 |
| 50–20 Decel | 82.5 | 2,064 | 60.5 | 6.5 | 1.1 | 21 | 2.5 | .20 |
| 20 m.p.h. Cruise | 31 | 680 | 28.5 | 2.6 | 1.1 | 21 | 1.7 | .15 |
| 20–30 Accel | 21.5 | 470 | 25 | 2.25 | 1.1 | 21 | 1.7 | .15 |
| 30 m.p.h. Cruise | 17.6 | 384 | 28.5 | 2.6 | 1.3 | 25 | 1.7 | .15 |
| 30–0 Decel | 18.5 | 405 | 66.5 | 7.56 | .9 | 17 | 1.7 | .15 |
| Idle | 23 | 503 | 76 | 9.4 | 1.1 | 21 | 1.0 | .10 |
| 0–30 Accel | 20.5 | 444 | 36 | 3.4 | .9 | 17 | 1.7 | .15 |
| 30 m.p.h. Cruise | 15.5 | 335 | 24.5 | 2.2 | .5 | 10 | 1.7 | .15 |
| 30–15 Decel | 25 | 550 | 70 | 8.15 | .5 | .10 | 3.5 | .30 |
| 15 m.p.h. Cruise | 22 | 485 | 60 | 6.4 | .8 | .15 | 3.0 | .25 |
| 15–40 Accel | 16.8 | 365 | 28.5 | 2.6 | 1.1 | 21 | 1.0 | .10 |
| 40 m.p.h. Cruise | 12.5 | 272 | 23.5 | 2.1 | 1.2 | 23 | 3.5 | .30 |
| 40–0 Decel | 48.5 | 1,084 | 71.0 | 8.4 | 1.4 | 27 | 3.5 | .30 |
| Idle | 28.7 | 630 | 76 | 9.4 | .9 | 17 | 1.0 | .10 |
| Average | 30 | 655 | 57 | 6.0 | 1.1 | 21 | 2.5 | .20 |

The effectiveness of the afterburner is especially evident in the ease in which it handles the tremendous hydrocarbon and carbon monoxide loads that are imparted to it under various engine operating conditions such as under decelerating conditions and under idling conditions. The efficiency of the afterburner is so pronounced that the exhaust gases therefrom can be discharged into closed garages and the like without any ill effects.

From the above description it should therefore be understood that this invention provides an inexpensive efficiently operating afterburner having a manifold which replaces the normal exhaust manifold of an automotive engine and a combustor which uses all available heat energy and burns the exhaust gas combustibles so completely that gas emissions from the afterburner are harmless. It should also be understood that the invention has wide usage in the minimizing of noxious combustible materials in exhaust gases regardless of their source, including especially industrial waste gases.

I claim as my invention:

1. An afterburner adapted to replace the exhaust gas manifold of an automotive engine which comprises a casing having inlet ports adapted to register with the exhaust valve ports of an automotive engine, said casing having a passageway along the length thereof immediately adjacent the inlet ports thereof to receive the exhaust gases, said casing having an elongated mixing tube receiving exhaust gases from said elongated passageway, a combustor in the casing receiving the gases from the mixing tube, means in said combustor for initiating and sustaining combustion, said casing having an annular passageway surrounding the mixing tube receiving burned gases from the combustor, said casing having a jacket providing an air chamber surrounding the burned gas passageway, said air chamber having ports discharging into the exhaust gas inlet passageway for admixing air with the exhaust gases as they flow en route to the mixing tube, and insulating material surrounding said casing, annular passageway, jacket and said combustor to confine exhaust gas heat and heat of operation to a zone immediately adjacent the vehicle engine.

2. An afterburner for an automobile engine adapted to replace the exhaust gas manifold of the engine which comprises a manifold casing adapted to be directly mounted on an engine block to receive exhaust gases directly from the exhaust valve ports of the engine, said manifold casing having an elongated inlet passageway directly communicating with the exhaust valve ports, an air jacket discharging into said passageway at spaced intervals along the length thereof, a central mixing tube, and a burning gas passageway between the mixing tube and the air jacekt for preheating the air and the air and exhaust gas mixture, and a combustor tube mounted on the mixing tube to receive the preheated admixed exhaust gases and air therefrom, a casing surrounding the combustor tube and defining therewith a turbulence burning chamber and an annular passage surrounding the combustor tube and burning chamber, connecting said burning chamber with the burning gas passage of the manifold casing, and ignition means carried by said combustor casing for initiating and maintaining combustion in the combustion tube and turbulence chamber.

3. An afterburner for replacing a conventional exhaust manifold of an automotive engine which comprises an elongated manifold casing having an inlet nipple for each exhaust valve port of the engine and an elongated exhaust gas passageway immediately adjacent the inner end of each nipple to directly receive exhaust gases from the engine before said gases can appreciably expand or lose their heat content, said manifold casing having a central elongated mixing tube communicating at one end with the elongated exhaust gas passageway, said casing having a burning gas passageway surrounding the mixing tube, said casing having an air jacket surrounding the burning gas passageway, ports in said air jacket discharging along the length of the exhaust gas passageway for admixing air preheated by the burning gases in the burning gas passageway with the exhaust gases en route to the mixing tube, and a combustor tube receiving the discharge from the mixing tube having an outlet passage communicating with the burning gas passage of the casing, and ignition means carried by said combustor casing for igniting and retaining combustion in the combustor.

4. An afterburner manifold for automotive engines which comprises a casing defining an elongated exhaust gas passageway receiving exhaust gases directly from the engine before the gases are allowed to expand, walls on said casing defining an air jacket discharging through ports along the length of the exhaust gas passageway, a mixing tube passageway receiving air and gases from the exhaust gas passageway and a burned gas passageway between the mixing tube and the air jacket, a combustor tube communicating with the downstream end of the mixing tube, a combustor casing surrounding said combustor tube in spaced concentric relation to provide a discharge passageway communicating with the burned gas passageway, and means in said combustor casing cooperating with the combustor tube to maintain combustion of the gases flowing through and from the combustor tube.

5. An afterburner manifold for automotive engines which comprises a casing defining a central mixing chamber, an annular burned gas chamber surrounding the central chamber, an air chamber surrounding the burned gas chamber, an elongated manifold passage communicating with each exhaust port of an engine along the length thereof and ports joining the air chamber with the manifold passage, and heat transfer tubes tightly fitted in said mixing chamber and said burned gas chamber dividing the chambers into a myriad of passages inside the tubes and surrounding the tubes for increasing the heat transfer efficiency of the chambers, a combustor tube communicating with the downstream end of the mixing chamber, and means in said combustor tube for igniting and maintaining burning in the combustor.

6. An afterburner manifold for automotive engines which comprises an elongated casing having an inlet port for each exhaust gas port of the engine, an elongated manifold exhaust gas passageway communicating with each inlet port, a central mixing chamber, a burning gas chamber surrounding the central mixing chamber, and an air inlet chamber surrounding the burning gas chamber for discharging into the manifold chamber, fluted heat transfer tubes in the mixing chamber and burning gas chamber in heat exchange relation with the casing walls to enhance the heat transfer efficiency of the chambers, an air inlet for the air chamber, a combustor tube communicating with the downstream end of the mixing chamber, means in said combustor tube for maintaining combustion, and a gas outlet for the burned gas chamber.

7. An afterburner combustor which comprises a tube, spaced parallel foraminous disks spanning the tube, separating rings between the disks spaced inwardly from the peripheries of the disks to form a central chamber through the inner portions of the disks and a peripheral passage for flowing burned gases in counter current relation to the flow of gases in the central chamber through the marginal portions of the disks, an inlet tube inside of the combustor tube for feeding a gas and air mixture to the central passage of the disks, an igniter in said combustor tube, and an exhaust gas outlet for the tube receiving the burned gases after they pass through peripheral passage and the marginal portions of all of the disks.

8. A combustor for an afterburner or the like which comprises a tube having a reduced diameter end, an outwardly tapered frusto conical portion, and an enlarged diameter main body portion, said enlarged diameter main body portion having a plurality of wire mesh screen disks in spaced parallel relation extending from the tapered portion into spaced relation from the end of the tube, an end wall for said end of the tube, said end wall cooperating with the last wire mesh screen disk to define a turbulence chamber in the tube, a metal ring between each screen disk spaced inwardly from the periphery of the screen disk and secured to the screen disks for providing a central passage through the screens and a surrounding annular passage for flowing burning gases in countercurrent relation to the flow of gases in the central passage through the screen disks, an inlet tube in the reduced diameter end portion of the aforementioned tube and flaring outwardly in said tapered portion of the aforementioned tube into engagement with the adjacent screen disk, said inlet tube cooperating with the aforementioned combustor tube to define an annular chamber communicating with the annular passage surrounding the rings of the disks, and an exhaust gas outlet communicating with the annular chamber around the inlet tube, and means for maintaining combustion of the gases flowing into the combustor tube.

9. A combustor comprising a tube having a central passage and a surrounding peripheral passage for flowing burning gases in counter current relation to the flow in the central passage, a series of spaced high heat transfer foraminous members spanning both passages, a barrier in the center of the central passage, an inlet for feeding a gas and air mixture to the central passage for flow through an annular path around the barrier and through said members, said tube having a burning chamber connecting the downstream end of the annular central passage with the upstream end of the peripheral passage, a means for maintaining combustion in said burning chamber, and an outlet at the downstream end of the peripheral passage whereby said members are heated with the gases in the peripheral passage and transfer heat to the mixture in the central passage for preheating the mixture and for cooling the burnt gases before they reach the outlet.

10. A combustor for an afterburner which comprises a tube, a series of spaced parallel foraminous disks spanning said tube, means dividing the disks into a central gas passage and a surrounding gas passage for flowing gases in countercurrent relation to the flow of gases in the central gas passage, means in the tube for feeding gases to the central gas passage, a turbulence chamber in said tube receiving the air-exhaust gas mixture from the central gas passage downstream from the last disk and for exiting the burning gases from said turbulence chamber through said surrounding passage, an igniter means in the turbulence chamber to maintain burning of the gases, and said surrounding passage receiving the marginal portions of the screen therethrough whereby the exiting burning gases will heat the screens to preheat the gases in the central passage.

References Cited in the file of this patent

UNITED STATES PATENTS

| | | |
|---|---|---|
| 1,605,484 | Thompson et al. | Nov. 2, 1926 |
| 1,789,812 | Frazer | Jan. 20, 1931 |
| 1,848,990 | Boyd et al. | Mar. 8, 1932 |
| 2,203,554 | Uhri et al. | June 4, 1940 |
| 2,263,318 | Tifft | Nov. 18, 1941 |
| 2,482,754 | Flint | Sept. 27, 1949 |
| 2,521,595 | Miller | Sept. 5, 1950 |
| 2,656,675 | Coar | Oct. 27, 1953 |
| 2,705,459 | Dunning | Apr. 5, 1955 |
| 2,806,347 | Pertile | Sept. 17, 1957 |
| 2,845,873 | Lapsley | Aug. 5, 1958 |
| 2,851,852 | Cornelius | Sept. 16, 1958 |